United States Patent

Fujita et al.

[11] Patent Number: 5,123,357
[45] Date of Patent: Jun. 23, 1992

[54] CONVEYOR DRIVEN BY LINEAR MOTOR WITH ROLLING SURFACE OF RAIL ACTING AS SECONDARY FOR THE MOTOR

[75] Inventors: Shigeyoshi Fujita; Naofumi Sekiya; Kazuyoshi Fukuhara; Yoshitaka Watanabe; Takashi Okamura, all of Osaka, Japan

[73] Assignee: Daifuki Co., Ltd., Osaka, Japan

[21] Appl. No.: 546,410

[22] Filed: Jun. 28, 1990

[30] Foreign Application Priority Data

Sep. 1, 1989 [JP] Japan .................. 1-228128
Sep. 1, 1989 [JP] Japan .................. 1-228129

[51] Int. Cl.⁵ .................. B60L 13/00
[52] U.S. Cl. .................. 104/290; 104/89; 104/294; 105/168
[58] Field of Search .................. 104/89, 94, 95, 290, 104/292, 294, 300; 105/168, 148; 303/107, 108, 109; 295/7, 11, 30.1, 31.1; 238/148

[56] References Cited

U.S. PATENT DOCUMENTS

| | | | |
|---|---|---|---|
| 2,819,681 | 1/1958 | Luvisi | 238/148 X |
| 3,111,265 | 11/1963 | Huber | 104/290 X |
| 3,555,380 | 1/1971 | Hings | 104/292 X |
| 3,696,752 | 10/1972 | Bourg | 104/290 |
| 3,966,264 | 6/1976 | Mattori et al. | 303/109 |
| 4,236,455 | 12/1980 | dos Santos | 104/290 |
| 4,702,661 | 10/1987 | Bisiach | 295/30 X |
| 4,794,866 | 1/1989 | Brandis et al. | 104/294 X |
| 4,817,533 | 4/1989 | Azukizawa et al. | 104/290 X |
| 4,841,869 | 6/1989 | Takeuchi et al. | 104/290 X |
| 4,922,830 | 5/1990 | Fujita et al. | 104/290 |

Primary Examiner—Robert J. Oberleitner
Assistant Examiner—S. Joseph Morano
Attorney, Agent, or Firm—Schweitzer Cornman & Gross

[57] ABSTRACT

The present invention is based on the critically important feature of providing a left-right parallel arranged linear motor-based conveying system in which the upper surfaces of the guide rails do double duty as providing the rolling surfaces for the wheel pairs, and also as being secondary (reaction) conductor surfaces for the linear motors, and the linear motors are spaced closely above the upper surfaces of the guide rails by a predetermined clearance.

10 Claims, 7 Drawing Sheets

CONVEYOR DRIVEN BY LINEAR MOTOR WITH ROLLING SURFACE OF RAIL ACTING AS SECONDARY FOR THE MOTOR

FIELD OF THE INVENTION

This invention relates a conveyor using a conveying electric car which is provided with a linear motor body on the side of the conveying electric car supported and guided by a guide rail, and with a secondary conductor assembly of the linear motor on the running path side.

BACKGROUND OF THE INVENTION

Heretofore, in a conveyor of this type, a secondary conductor surface of the linear motor was provided in a position remote from the rolling surface of the wheel for supporting the electric car on the guide rail, or a secondary conductor rail of the linear motor was provided together separately from the aforementioned guide rail.

In such a conventional linear motor-driven conveyor, a gear relative accuracy between the running surface of the wheel that supports to the electric car of the guide rail and also the secondary conductor surface of the linear motor can create problems. In such cases the clearance between the linear motor body and the secondary conductor surface can vary, leading not only to decreased efficiency, but, in the worst case, there is a danger of bringing both into mutual contact, even if the linear motor body is mounted on the conveying electric car side with sufficient accuracy.

It is a primary object of the invention to solve problems which occur in conventional linear motor driven conveyors.

DESCRIPTION OF THE INVENTION

The conveyor of the present invention has a pair of right-left guide rails which also serve as secondary conductor surfaces of the linear motor, and the rails are arranged along the running path of the conveying electric car. A pair of right-left linear motor bodies are mounted on the conveying electric car that is supported by wheels and moves by rolling on their rolling running surfaces, through clearances, respectively.

Thus by using the wheel rolling running surfaces of the pair of right-left guide rails also as the secondary conductor surface of each linear motor, it is easy to maintain constant clearance between the linear motor body and the secondary conductor surface. This is so even when the linear motor body is mounted on the conveying electric car only with a sufficient level position accuracy of the supporting wheel, even when the dimensional accuracy of the guide rail itself is somewhat poor, on the wheel rolling running surface is worn, but without decreased efficiency due to increased clearance or possible lack of contact of the linear motor body with the guide rail. Thus the conveying electric car can always can be driven safely and with good efficiency.

Since the guide rails can be separated from the right and left linear motor bodies, the space between both rails can be put to practical use as a support for the protective cover plate covering both guide rails, and as a distribution space for the electric supply rail unit.

The linear motor body mounted on the conveying electric car has a rectangular shape with its longer dimension in the direction of the guide rails. The rails also serve as the secondary conductor assembly. If this elongated linear motor body is fixed to the conveying electric car in the direction parallel to the guide rail, the linear motor body being also linear to the secondary conductor assembly that is bent in a circular shape along the horizontal curve assembly. This greatly decreases the area of the linear motor body and when the secondary conductor assembly is opposing it in an up-down direction, and results in substantially decreased efficiency of the linear motor, making it impossible to obtain necessary thrust.

Thus, it is a secondary object of the invention to enable certain and strong propelling of the conveying electric car by assuring efficient operation of the linear motor. This is attained by providing a moving means for the linear motor body, which can support that body movably in right-left horizontal direction relative to the conveying motor car, and at said horizontally curved path section can move the linear motor body toward the outside of the horizontally curved path assembly.

This configuration laterally moves the linear motor body toward the outside, and makes it possible at the horizontally curved path section in the running path, to prevent the decrease in the up and down opposing area between the linear motor body and the linear motor secondary assembly of the guide rail. This eliminates the necessity to bend the guide rail into a special shape using the linear motor secondary conductor assembly in combination in the horizontal curved path assembly, or specially to enlarge the width of the guide rail that constitutes the secondary conductor assembly. Still, in the horizontal curved path assembly also, with the up-down opposing area between the linear motor body and the secondary conductor assembly sufficiently secured, the conveying electric car can be efficiently driven by the linear motor.

The conveying electric car is movably supported on a pair of right-left guide rails by the four wheels at the four corners of the car. To drive forward such a conveying electric car by linear motors, a pulse encoder is connected to the wheels which move by rolling on the guide rails. The present speed of the conveying electric car is detected at any given time from the pulse transmitted by the pulse encoder, and the linear motor is controlled by that present speed reading to control the running conditions of the electric car.

Such a control is possible if there is no large error between the peripheral speed of a specified wheel interlocked to the pulse encoder and the actual speed of the conveying electric car. When the conveying electric car is supported by guide rails with four wheels as above, there is a very large possibility that any one of the four wheels will rise off the guide rails due to a change such as level change of the guide rail. Therefore, a specified wheel interlocked to the pulse encoder can rise off the guide rail, and its peripheral speed drops lower than the actual running speed, or, as the case may be, is completely stopped. This can result in that the present speed information obtained from the encoder connected to the specified wheel is greatly decreased from the actual running speed, an erroneous acceleration command is transmitted, and accurate speed control becomes impossible.

Therefore, a third object of the invention is that, should a specified wheel interlocked to the encoder rise off the guide rails, no malfunction is caused in the control of linear motor. To attain such an object, any two of the four wheels are connected to a pulse transmitting means such as a pulse encoder, and provided with comparing means for comparing the rotary speeds of the two wheels from the pulses transmitted from both the pulse transmitting means, and a switching means which reports to the speed control device a pulse transmitted from the pulse transmitting means corresponding to a higher rotary speed based on the comparison by the comparing means, than the present speed information.

According to such configuration of the invention, from the four wheels of the conveying electric car, if one of the two wheels connected to a pulse transmitting means rises off the rails, and the peripheral speed of the wheel becomes lower than the actual running speed of the car or even becomes zero, the change in the condition is detected by the above comparison means. Thereupon the comparison means automatically changes over the switching means to input as the present speed information only the pulse from the pulse oscillating means which is connected with another wheel the peripheral speed of which is the same as the running speed of the electric car.

Therefore, if any one of the four wheels supporting the conveying electric car on the guide rails is raised off the rail, the control unit actually receives as the present speed information pulses of a frequency that is proportional to the actual running speed of the car. Thus, accurate and precise control is possible based on the pulse from the pulse oscillating means.

Other objects, features, and advantages of the invention will be apparent from the following detailed desciption.

DESCRIPTION OF THE DRAWING

The present invention is described in greater detail with reference being had to the drawing wherein.

DETAILED DESCRIPTION OF THE INVENTION

In the first embodiment shown in FIG. 1-4 is a conveying electric car 1 is provided with two right-left pairs of supporting wheels 3a, 3b and 4a, 4b arranged in front and back relationship. The wheels roll on a pair of guide rails 2A and 2B laid along the running route of the electric car 1, and paris of follower positioning guide rollers 7—7 and 8—8 are supported from vertical shafts on wheel shaft-supporting members 5a and 6a. These members support individually the supporting wheels 3a and 4a which roll on a guide rail 2A, to hold the guide rail 2A from both right and left sides each at front and back two positions, and also support a right-left pair of linear motor bodies 9A and 9B.

Figure 1:
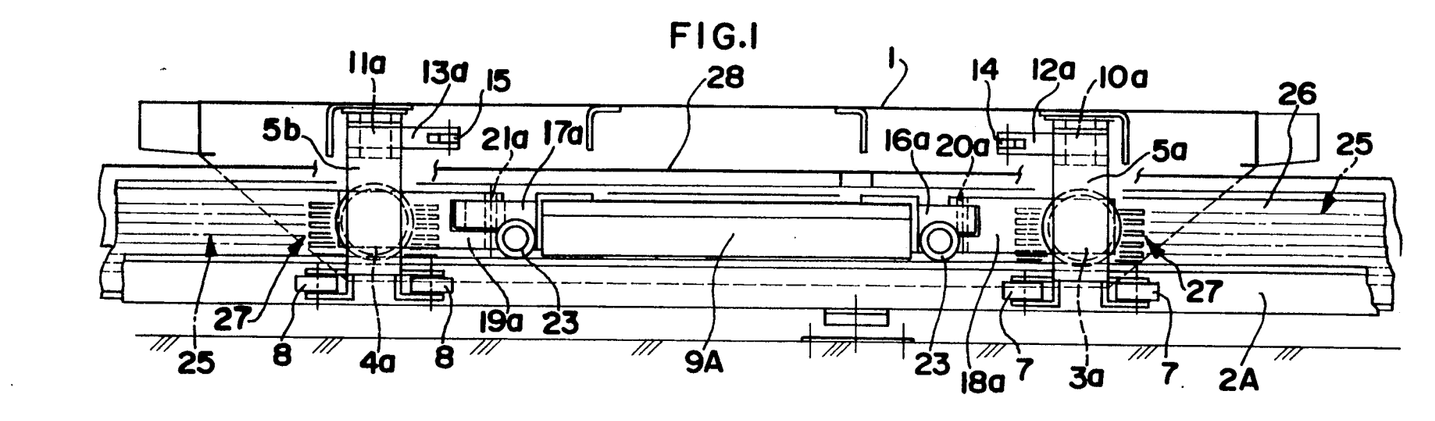
FIG. 1 is a longitudinal partial cross-sectional view showing a first embodiment.
Figure 2:
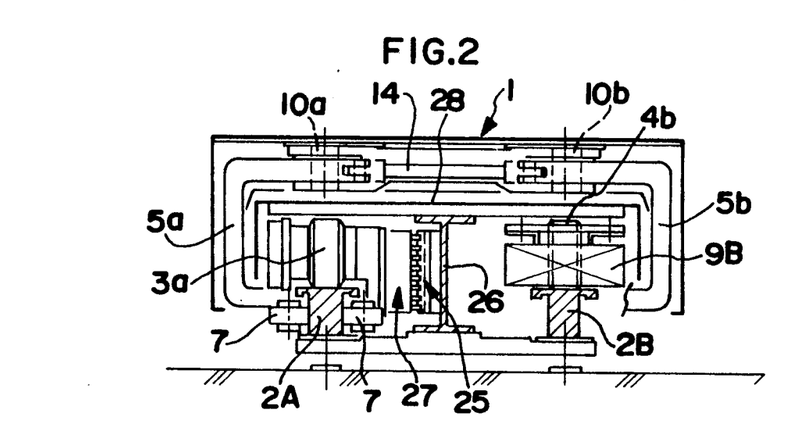
FIG. 2 is a longitudinal partial cross-sectional front view of the embodiment of FIG. 1.
Figure 3:
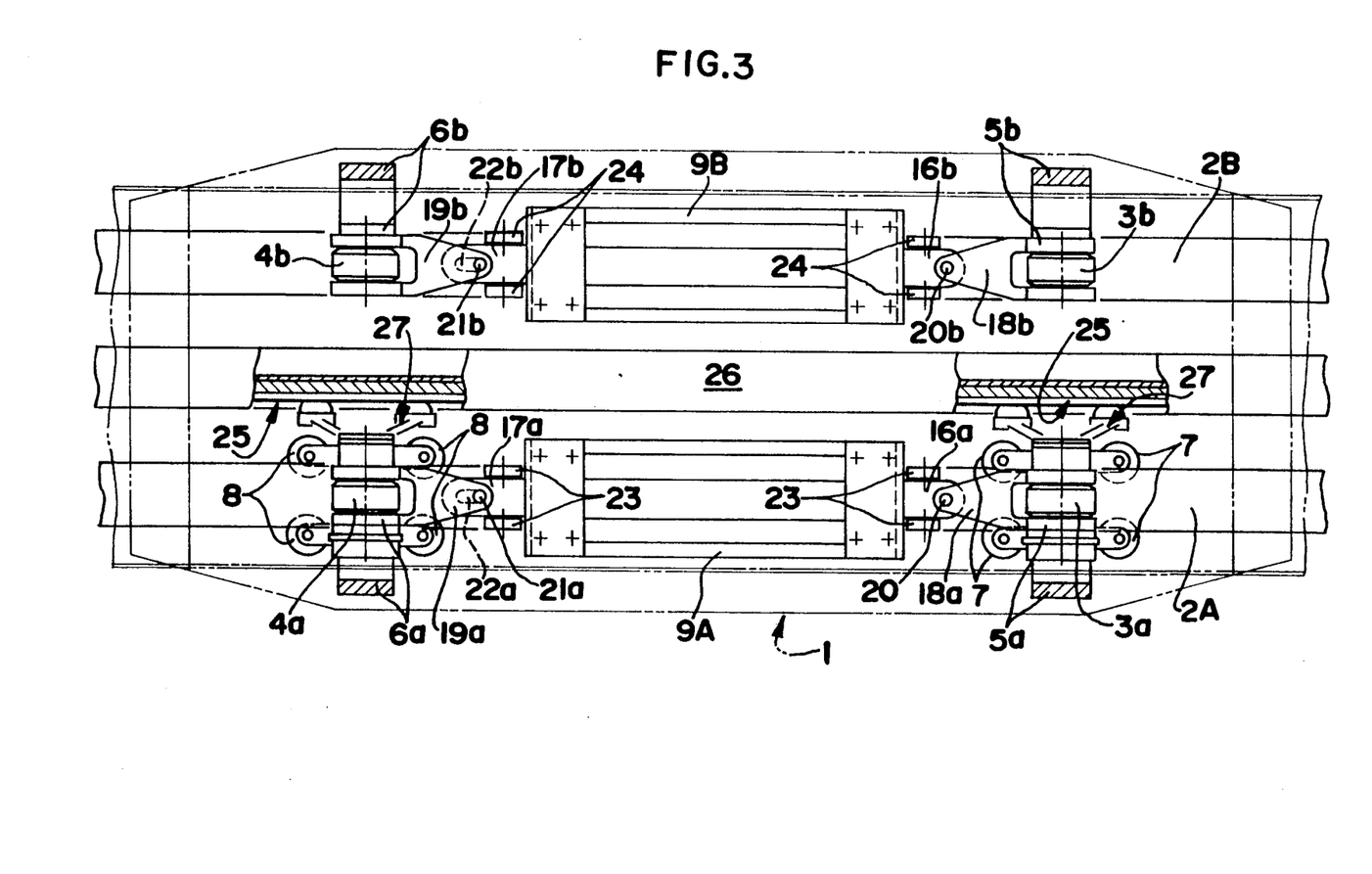
FIG. 3 is a plan cross-sectional view of the embodiment of FIG. 1.

Each of wheel shaft-supporting members 5b and 6b which separately supports the supporting wheel 3b and 4b rolling on the wheel shaft-supporting members 5a and 6a and the other guide rail 2B, is swingably supported by vertical supporting shafts 10a–11b at the position just above each wheel 3a–4b. Each right-left pair of wheel shaft-supporting members 5a, 5b and 6a, 6b, is connected to the interlocking arms 12a, 12b and 13a, 13b through connecting rings 14 and 15, so as to interlock in a same direction.

The linear bodies 9A and 9B are provided with brackets 16a, 17a and 16b and 17b projecting from both the respective front and back ends of each linear motor body 9A and 9B. The brackets are swingably supported by vertical supporting shafts 20a, 21a and 20b, 21b in the inner end assembly of supporting arms 18a, 19a, and 18b, 19b. These supporting arms are connected to the respective front and back wheel shaft supporting members 5a, 6a and 5b, 6b. The supporting shafts are placed in the same respective sides on the right or left through the brackets 16a, 17a and 16b and 17b.

The brackets 17a and 17b are provided in the longitudinal direction of the linear motor bodies 9A and 9B with elongated slots 22a and 22b, and these slots are penetrated by the vertical supporting shafts 21a and 21b. Two pairs of right side and two pairs of left side of linear protective rollers 23 and 24 are respectively mounted from shafts attached to the brackets 16a, 17a and 16b, 17b at both the ends of the linear motor body. These protective rollers contact the guide rails 2A and 2B when the clearance between the linear motor bodies 9A and 9B and the guide rails becomes less than a predetermined value.

A power supply rail 25 supported by one side of a supporting rail 26 which is disposed between the guide rails 2A and 2B. The power supply to the linear motor bodies 9A and 9B, and the signal transfer between a main controller on the ground and a subcontroller on the conveying electric car 1 is effected by sliding contact between a current collector 27 and the rail 25. The collector is mounted from the wheel shaft supporting members 5a and 6a on the conveying electric car. The supporting rail 26 supports the right and left guide rails 2A and 2B and a gate type cover plate 28 covering the power supply rail unit 25. Each supporting wheel 3a–4b on the conveying electric car 1 is disposed to pass under the cover plate 28. As shown in FIG. 2, the wheel shaft supporting members 5a through 6b are extended through to below both sides of the cover plate 28 upward to the outside and are attached to the conveying electric car 1 with the vertical supporting shafts 10a through 11b.

Figure 5:
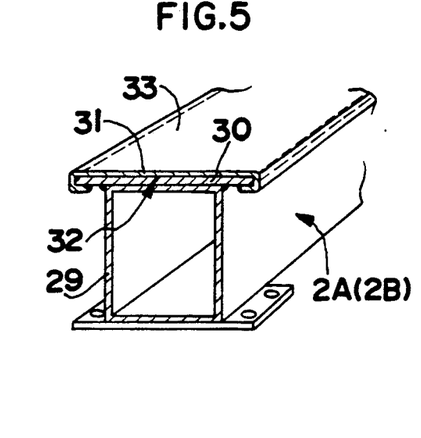
FIGS. 5 and 6 are cross-sectional perspective views showing the structure of the guide rail.

As shown in FIG. 5, the guide rails 2A and 2B are each comprised of a square steel pipe 29 as a strength-providing supporting member, with a steel plate 30 attached thereto. The plates 30 each are covered with a sheet of a nonmagnetic cover material 31. The nonmagnetic cover material 31 and the steel plate 30 constitute a secondary conductor assembly for the linear motor. Accordingly, the surface of the nonmagenetic cover material 31 mades the wheel rolling runner surface 33 also serves as a secondary conductor surface for the linear motor.

Figure 6:
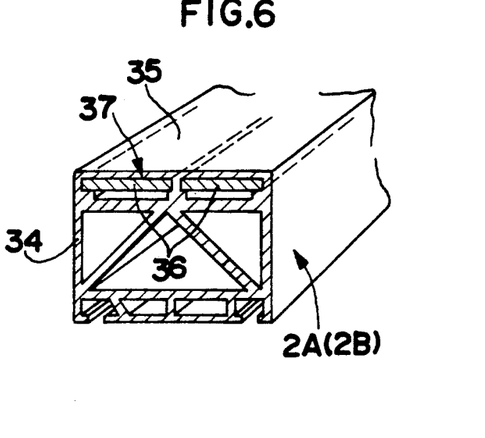

The guide rails 2A and 2B can be shaped e.g. instead of the square steel pipe 29, shown in FIG. 5, as an H section steel rail or as is shown in FIG. 6, it is possible to use as a secondary conductor assembly 37 for the linear motor, an interposed steel plate 36 along the rolling surface 35 in a guide rail body 34 made of aluminum and having a box type cross-section.

By energizing the right-left pair of linear motor bodies 9A and 9B of the linear motor driven conveying car 1 and disposed opposite to the wheel rolling running surface 33 that is the secondary conductor surface of the linear motor. The rolling running surface 33 is disposed on the right-left pair of guide rails 2A and 2B with a very small clearance between them. The magnetic action respectively between the linear motor bodies 9A and 9B and the secondary conductor assembly 32 of the guide rails 2A and 2B produce a thrust in a given direction of the conveying electric car 1 and drives it along both the guide rails 2A and 2B.

Figure 4:
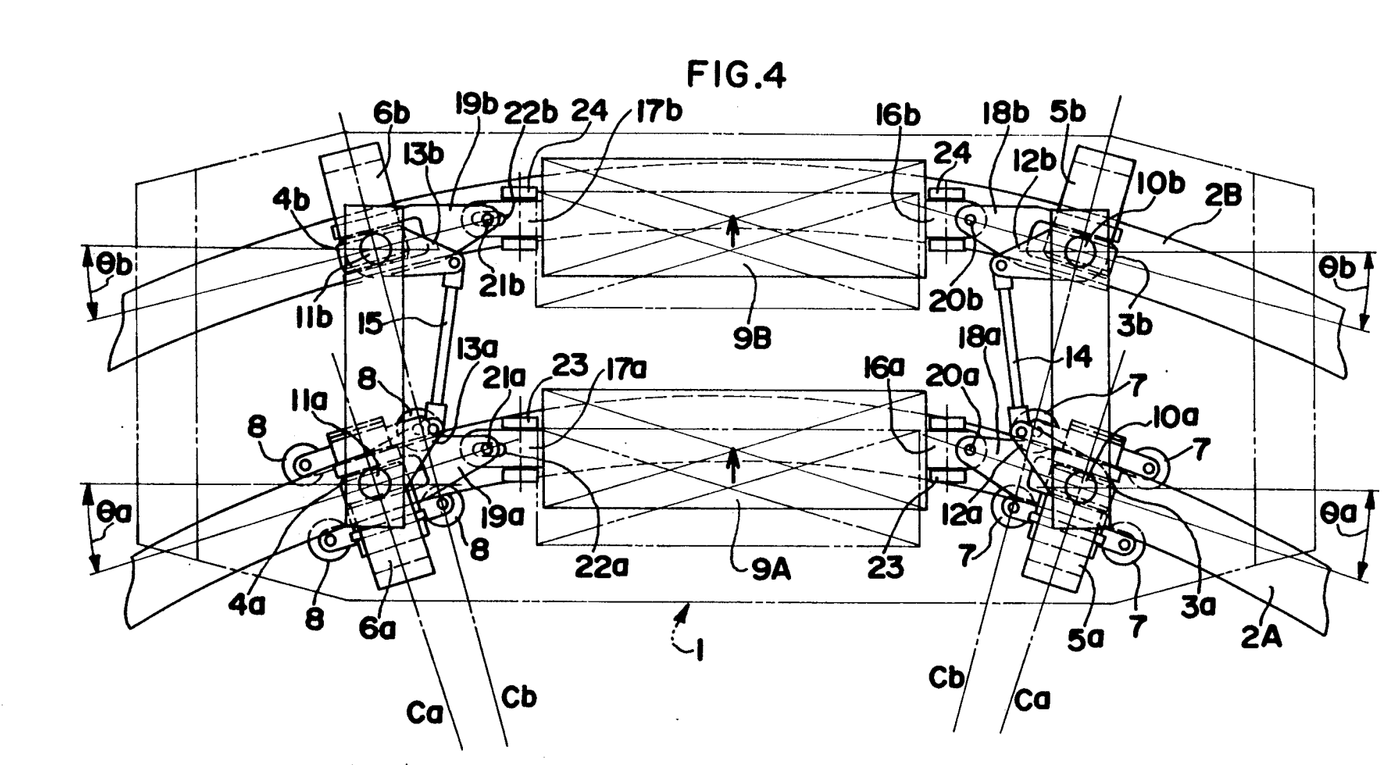
FIG. 4 is a schematic plan view showing the running conditions at a horizontal curved path assembly.

As shown in FIG. 4, when the conveying electric car 1 runs on a horizontal curved route, the supporting wheels 3a and 4a rolling on one of the side guide rail, the rail 2A, are steered in the curving direction of the guide rail 2A, as the wheel shaft supporting members 5a and 6a are caused by follower positioning guide rollers 7 and 8 to swing around the vertical supporting shafts 10a and 11a and follow the bend of the guide rail 2A. This steering motion of the wheel shaft supporting members 5a and 6a is transmitted to the wheel shaft supporting members 5b and 6b in the opposite side through interlocking arms 12a through 13b on both sides, and through interlocking links 14 and 15. The wheel shaft supporting members 5b and 6b also swing around the vertical supporting shaft 10b and 11b. This also automatically steers the supporting wheels 3b and 4b supported by the wheel shaft supporting members 5b and 6b in the curving direction of the guide rail 2B. Therefore, the conveying electric car 1 can smoothly run along a horizontal curving route.

When the guide rail 2A supporting the supporting wheels 3a and 4a which are forced to make steering motion by the positioning guide rollers 7 and 8, on the inside of the horizontal curved route assembly, has a smaller turning radius than the other guide rail 2B slanting of the interlocking arms 12a, 12b, and 13a, 13b towards each other, instead of disposing them parallel to each other the effective lengths of the interlocking links 14 and 15 will be smaller than the distance between the vertical supporting shafts 10a, 10b and 11a, 11b. Thus the steering angle Ob of the wheels 3b and 4b rolling on the other guide rail 2B becomes smaller than the steering angle Oa of the wheels 3a and 4a rolling on the guide rail 2A. In the reverse case when the guide rail 2A is on the outside of the horizontal, curved route assembly, the steering angle Ob of the wheels 3b and 4b rolling on the other guide rail 2B becomes larger than the steering angle Oa of the wheels 3a and 4a rolling on the guide rail 2A. Thus, by adjusting the lengths of the interlocking arms 12a through 13b and of the interlocking links 14 and 15 so that the rotary center axes Ca and Cb of any of the wheels 3a–4b directs in the direction of the center of arc of the guide rails 2A and 2B that is, the tangential direction of guide rails 2A and 2B at each position of the wheel, then each wheel 3a–4b can be run by rolling along a horizontal curved route assembly with the least resistance.

On the other hand, when a conveying electric car 1 runs along a horizontal curved route, as shown in FIG. 4, the motion of the wheel shaft supporting members 5a, 6a and 5b, 6b which makes automatic steering in the curving direction of the guide rails 2A and 2B is transmitted to either the linear motor bodies 2A and 2B through the supporting arms 18a–19b and vertical supporting shafts 20a–21b, both the linear motor bodies 9A and 9B are automatically shifted in the direction away from the center of the curve, to prevent each linear motor body 9A and 9B from derailing from above its respective guide rail 2A or 2B. Thus, the conveying electric car 1 can be moved forward with certainty along a horizontal curving route without lowering the efficiency of either of the linear motors.

Figure 7:
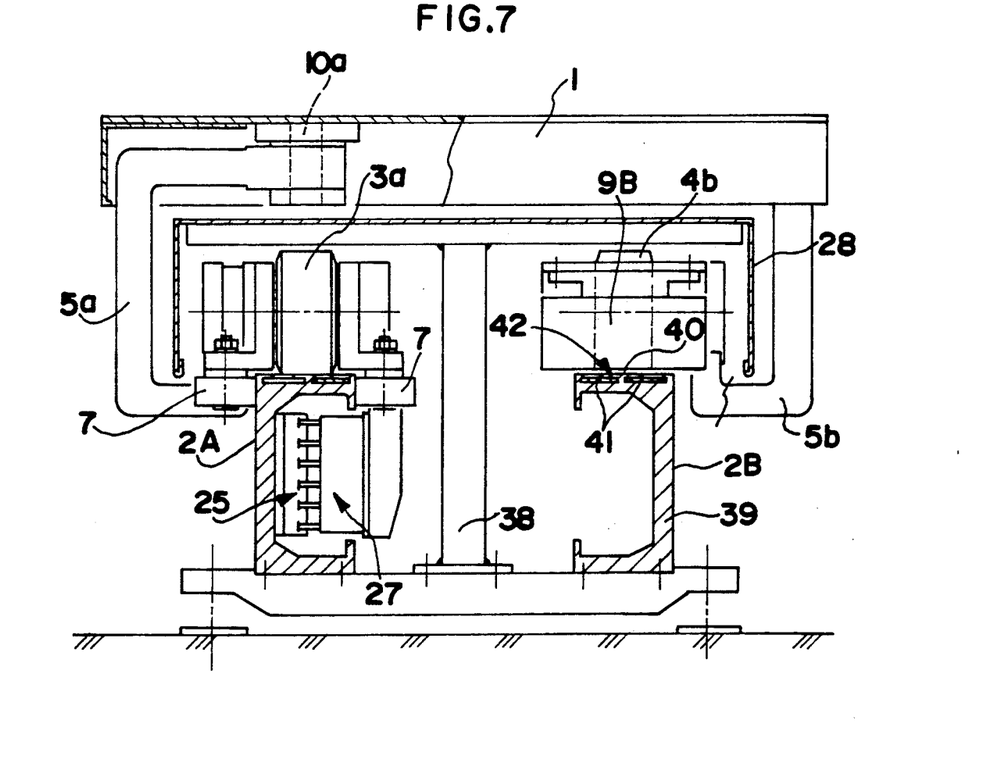
FIG. 7 is a longitudinal cross-sectional front view of a second embodiment.

As shown in FIG. 7, in a different embodiment the power supply rail 25 can be mounted on the side of a guide rail 2A. In the case, T shaped supporting members 38 are positioned between the guide rails 2A and 2B at appropriate intervals. The cover plate is not a mandatory requirement of the present invention, and can be omitted if it is not required. The guide rails 2A and 2B shown in FIG. 7 are aluminum guide rail bodies 39 of grooved cross-section provided with a steel plate 41 interposed along the rolling surface 40 for the wheels forming a secondary conductor 42 and the rails. The steel rolling surface 40 also serves as a secondary conductor surface for the linear motor.

The right-left pair of wheel shaft supporting members can also be interlocked in another manner. For example, as shown in the alternate embodiment of FIG. 8, it is also possible to stretch tensile chains, or wires, 45 and 46 between the interlocking arms 43a and 43b and between 44a and 44b extended outwardly from each of the right and left pairs of wheel shaft supporting members 5a, 5b and 6a, 6b, and stretch tensile springs 49 and 50 between the interlocking arms 47a, 47b and 48a, 48b extended inwardly from each of the wheel shaft supporting members 5a, 5b and 6a, 6b. These springs 49 and 50 keep the stretching chains 45 and 46 tight, to connect and interlock with each other the right and left pairs of wheel shaft supporting members 5a, 5b and 6a, 6b and to cause them to steer in a same direction.

Figure 8:
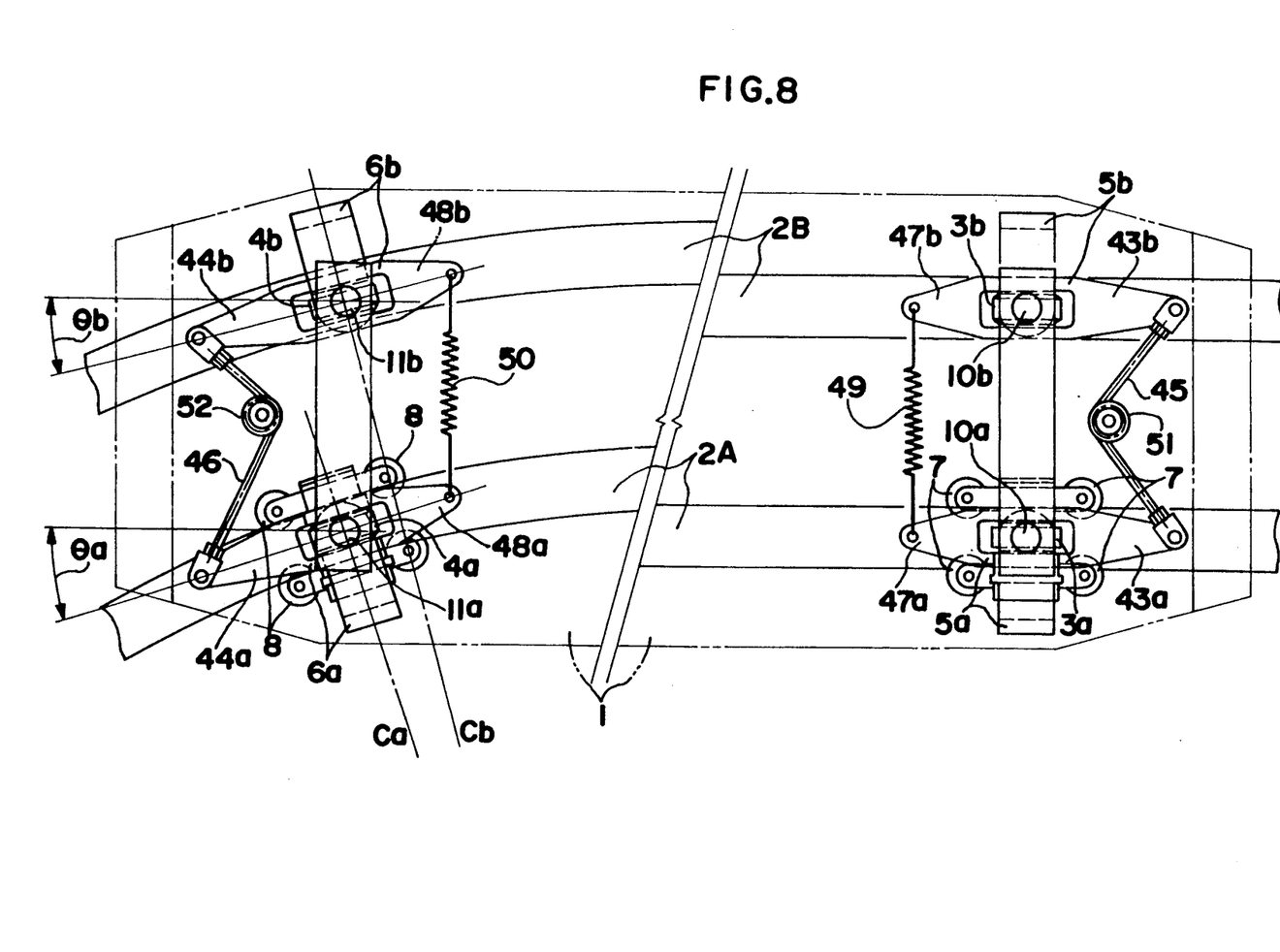
FIG. 8 is a schematic plan view of a third embodiment with the linear motor body omitted.

Position fixing idling gears 51 and 52 are used to bend a respective tensile chain 45 or 46 in form as shown in FIG. 8, whereby the steering angle Oa of the wheels 3a and 4a, and the steering angle Ob of the wheels 3b and 4b can be changed so that the rotary center axis Ca or Cb of any wheel 3a to 4b is directed towards the center of the guide rails 2A and 2B.

A steering mechanism for automatically steering the wheels supporting the conveying electric car along the guide rail is used when the conveying electric car runs on a curved route. However, it is possible to provide a dedicated linear motor body moving means separately from the steering mechanism. For example, it is possible to provide the linear motor body supported laterally and horizontally movably with positioning guide rollers holding a secondary conductor assembly or with guide rollers engaging the dedicated guide rail assembly provided together along the secondary conductor assembly, and allow the linear motor body to move by laterally following the horizontal curve of the secondary conductor assembly or dedicated guide rail assembly.

Positioning guide rollers 7 and 8 were used together automatically to steer the wheels supporting the conveying electric car along the guide rail, but they can be omitted when the supporting wheels 3a and 4a are replaced by grooved wheels engaging the guide rail 2A, or the wheels 3a and 4a are engaged with a groove provided in the guide rail 2A, to allow the supporting wheels 3a and 4a to steer themselves along the guide rail 2A.

Then, the running control unit for linear motor driven conveying electric car will be described.

Figure 9:
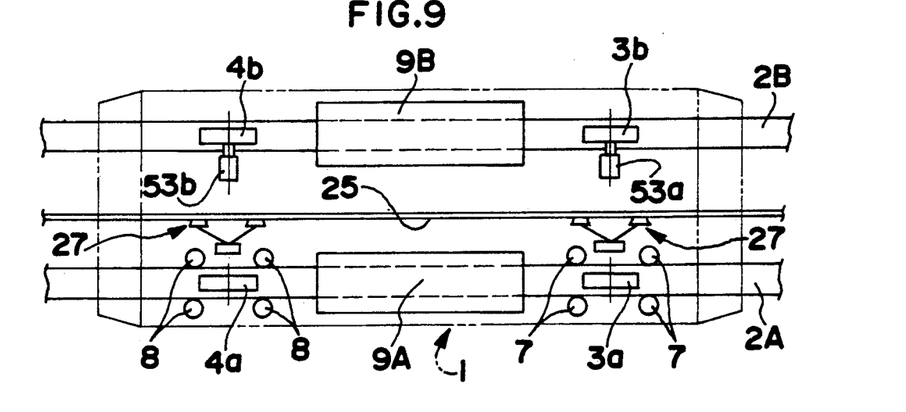
FIG. 9 is a schematic plan view of a fourth embodiment.

As shown in FIG. 9, a front and back pair of supporting wheels 3b and 4b rolling on one side guide rail 2B, are connected to pulse transmitting means 53a and 53b, for example pulse encoders. These pulse transmitting means 53a and 53b are mounted on the wheel shaft supporting members 5b and 6b (see FIG. 3) supporting each of the wheels 3b and 4b.

Figure 10:
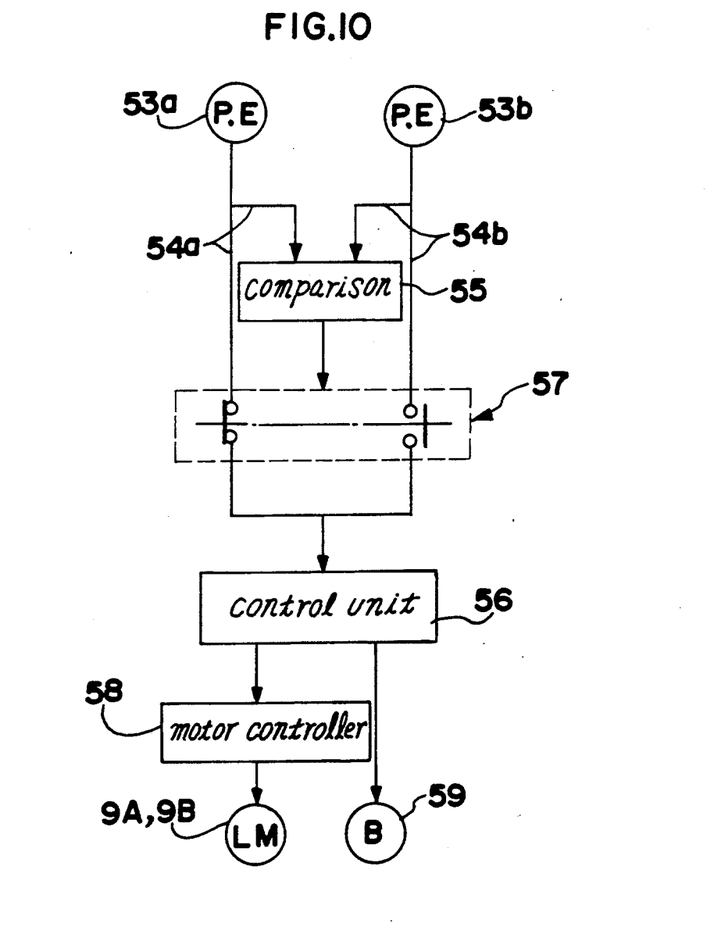
FIG. 10 is a block diagram of the configuration of the control system.

As shown in FIG. 10, pulses 54a and 54b issued by the pulse transmitting means 53a and 53b are entered into a comparison means 55, and here the rotation speeds of the wheels 3b and 4b are compared based on the periodicity or number of pulses transmitted per unit time. A switching means 57 is provided which gives to the speed control unit 56 the pulse 54a or 54b transmitted from either the pulse transmitting means 54a or 53b whichever sends the larger rotation speed compared based on the results of the comparison means 55, then the present speed informatio, or automatically controls the electromagnetic brake 59 connected interlocked to the supporting wheels 3a and 3b.

The conveying electric car 1 rolls one every supporting wheel 3a through 4b on the guide rails 2A and 2B. The rotation of the two supporting wheels 3b and 4b rotates the pulse transmitting means 53a and 53b, and these transmit pulses 54a and 54b respectively, with a periodicity that is proportional to the respective rotation speed of each wheel 3b and 4b. The pulse 54a and 54b transmitted respectively from the pulse transmitting means 53a and 53b are entered into the comparison means 55, and the pulse periodicity or the number of pulses transmitted in unit time, are compared. The comparison means 55 selects from the transmitted pulses 54a and 54b, that one that has the shorter pulse periodicity, or that having a larger number of pulses transmitted in unit time. This means the pulse 54a or 54b transmitted from the transmitting means 53a or 53b interlocked to the wheel having higher rotation speed as to between two wheels 3b and 4b. The signal from the comparison means automatically controls the switching means 54 so that it inputs into the control unit only the selected pulse 54a or 54b. Thus only the pulse 54a or 54b transmitted from the pulse transmitting means 53a or 53b interlocked to the wheel having higher rotation speed is actually entered into control unit 56 as the present speed information.

When either of the two wheels 3b and 4b is running in contact with the wheel rolling face 33 of the guide rail 2A, at a peripheral speed equivalent to the running speed of the conveying electric car 1, the pulse period of the transmitted pulse 54a and 54b or the number of pulses per unit time are the same. In this case, the switching means 57 may have been switched so that the pulse 54a transmitted from the preset one-side pulse transmitting means, for example, the output of pulse transmitting means 53a is entered into the control unit 56.

In the case of that such configuration, even if among the four supporting wheels 3a and 4b, one of the 2 wheels 3b and 4b connected to the pulse transmitting means 53a and 53b, for example, wheel 3b, rises off the rolling running surface 33 of the guide rail 2B and the peripheral speed of the wheel 3b, or 4b, as the case may be, becomes lower than the actual running speed of the electric car 1, or becomes even zero, the change of the conditions is detected by the comparison means 55 and it automatically switches over the switching means 56 from the condition in which the pulse transmitting means 53a, is connected to the control unit, to the new condition in which the pulse transmitting means 53b is now connected to the control unit 56. Thus, only the pulse 54b is transmitted from the pulse transmitting means 53b connected to the other wheel 4b that corresponds to the actual peripheral speed of the electric car, and this is entered into the control unit as the present speed information, without entry of transmitted pulse 54a from the pulse transmitting means 53a which is lower in speed due to it having risen off wheel.

The control unit 56 controls the motor controller 58 and electromagnetic brake 59, based on the transmitted pulse 54a or 54b as the present speed information is in a manner known per se.

Generally, a wheel rising off the wheel rolling running surface 33 of a guide rail is lower in rotation speed than that normally in contact with the wheel rolling surface 33. When a conveying electric car 1 is in the process of deceleration, for example, the wheel rising off the wheel rolling surface 33 begins to skid by inertia earlier than the wheel rotating normally in contact with the wheel rolling surface. When such a phenomenon occurs, the pulse from the pulse transmitting means connected to the wheel skidding at high rotation and raised off the guide rail, is supplied to the control unit 56 as the present speed information, and normal speed control becomes impossible.

Figure 11:
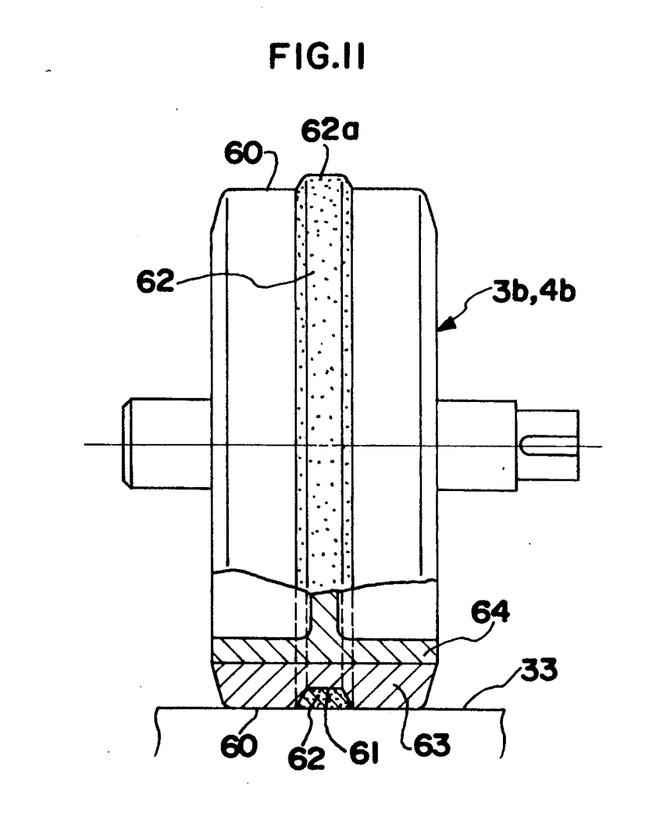
FIGS. 11 and 12 are partial cross-sectional elevational views showing the detailed structure of a wheel interlocked with the pulse transmitting means.
Figure 12:
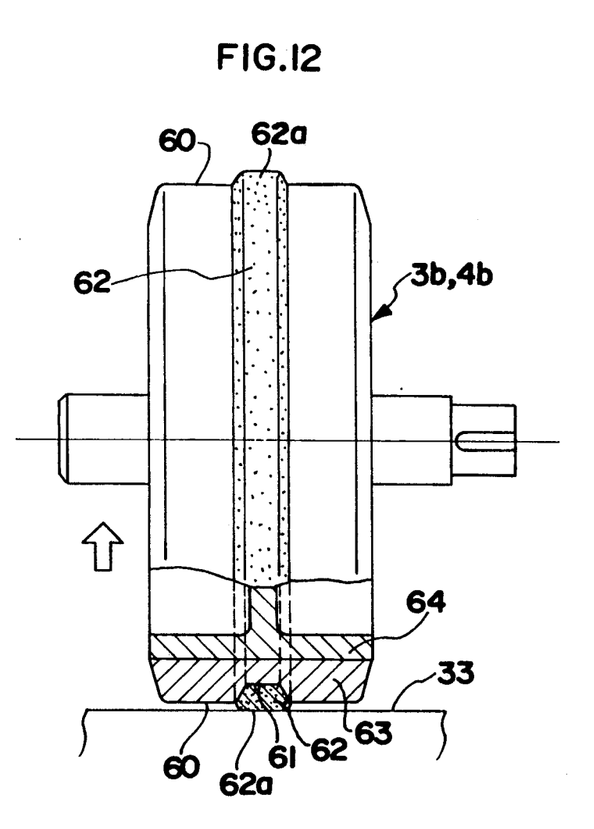

This inconvenience can be solved in the manner described below. As shown in FIGS. 11 and 12, the two supporting wheels 3b and 4b connected to the pulse transmitting means 53a and 53b, are provided in their center with a continuous annular peripheral concave groove 61 and a soft annular elastic body 62 is fitted in the annular concave groove 61 with a peripheral portion projecting outwardly from the periphery of the wheel. The soft annular elastic protrusion 62 can be deformed by compression as shown in FIG. 11, when the periphery 60 of the wheel contacts the rolling running surface 33 of the guide rail due to the load, so that the total elastic matter is buried in the annular concave groove 61. As shown in FIG. 12, the height of the projection from the wheel periphery 60 is set so that when the wheel periphery 60 is raised off the rolling running surface 33 of the guide by about 1 to several mm, the wheel diameter is elastically enlarged to project outwardly of the wheel periphery 60. This can take place to the extent that periphery 62 can contact the wheel rolling surface 33 of the guide rail. That is, when the wheel periphery 60 is raised off the wheel rolling surface 33 of the guide rail in normal range, the periphery 62a of the annular elastic body 62 will contact the wheel rolling surface 33 with certainty and the wheels 3b and 4b roll due to their enlarged effective diameter. A rigid elastic body such as urethane resin 63 forms the periphery 60 of each wheel, and is bonded to the peripheral surface of the wheel body 64.

According to the previously described configuration, as far as the wheels 3b or 3b rise off the wheel rolling running surface 33 in the normal range, the wheel 3b or 4b continues to roll with certainty by friction due to the somewhat enlarged effective diameter of the periphery 62a of annular elastic body 62, with the elastically enlarged diameter.

Accordingly, since the wheel 3b or 4b which is raised off the wheel rolling surface 33 can be rotated with certainty at low speeds even if during deceleration, such an inconvenience as the speed control is effected based on the pulse transmitted from the pulse transmitting means connected to the wheel idles at high speeds as raised off the guide rail. Thus, accurate speed control can be always effected.

Further, if one out of two of pulse transmitting means 53a and 53b goes out of order, and cannot transmit pulse, the speed control is effected based on the pulse transmitted from the other normal pulse transmitting means, judging that the wheel interlocked to the troubled transmitting means has been stopped being raised off the wheel rolling surface of the guide rail. In such a case, if the wheel connected to the functioning of one of the pulse transmitting means is raised off the wheel rolling running surface, the pulses from both pulse transmitting means 53a and 53b close, and running control becomes impossible with the carrying electric car appearing to be stopped even though it runs normally in actuality. Such an inconvenience can be prevented, since the wheel rotation can be continued to be induced without stopping even though the wheel is raised off the wheel rolling running surface. The two wheels for connecting to the pulse transmitting means 53a and 53b, can be selected from among the four wheels 3a to 4b, and are not limited to the front and back pair of wheels for supporting 3b and 4b rolling on one side of guide rail 2B as shown in the illustrated embodiment. In the embodiment, the comparison means 55 and switching means 57 are shown as separate apparatus, but in practice these can be implemented by a combination of appropriate peripheral equipment and microcomputer, sequencer, etc. with a suitable program having been entered.

The present invention can thus be implemented, with the following distinguishing features:

1. Guide rails 2A and 2B comprising steel rail bodies composed of rectangular steel pipes 29 and steel plates 30 with wheel rolling running surface covered with a nonmagnetic covering material 31.

2. Guide rails 2A and 2B comprising a rail body 34 molded from a nonmagnetic material such as aluminum, having wheel rolling running surface is interpolated with steel plates 36.

3. A protective roller 23 is supported at front and back ends of a right and left pair of linear motor bodies 9A and 9B, to contact the wheel rolling running surface 33 and to rotate when the clearance between each of the linear motor bodies 9A and 9B and the rolling running surface 33 becomes less than a predetermined value. In this case, it is preferable that each linear motor body 9A and 9B be supported vertically movably within a certain range from the conveying electric car 1.

4. The supporting wheels 3a to 4b are steerably arranged along the guide rails 2A and 2B, in front and back relationship with respect to the right and left pair of linear motor bodies 9A and 9B, holding the front and back ends of each linear motor body 9A and 9B with the steering wheel shaft supporting members 5a, 6a and 5b, 6b positioned in the front and the back of them, so that the linear motor bodies 9A and 9B can move laterally outwardly of the horizontal curved route of the supporting wheels 3a through 4b.

5. Interlocking connection is provided between a right and left pair of steering wheel shaft supporting members 5a, 5b and 6a, 6b, so that from among the four supporting wheels 3a to 4b, only a front and back pair of supporting wheels 3a and 4a rolling on one of the side guide rails 2A are engaged through the positioning guide rollers 7 and 8 or directly with the guide rail 2A and are allowed to be forcibly steered. The other front and back pair of supporting wheels 3b and 4b rolling on the other guide rail 2B are steered by being interlocked with the steering action of the supporting wheel 3a and 4a positioned in the side.

According to the foregoing configuration, since the conveying electric car 1 can be supported separately at four positions by four wheel shaft supporting members 5a to 6b, even in the case of a conveying electric car for conveying heavy loads the load on the steering vertical supporting shaft becomes smaller. Thus, the construction of that portion becomes easier and the electric car body can be supported stably. In addition, each supporting wheel 3a to 4b can be smoothly steered along the inside and outside guide rails 2A and 2B even when the route is curved.

6. An annular elastic body 62 is mounted on the periphery 60 of the two supporting wheels 3b and 4b that are connected to the pulse transmitting means 53a and 53b. That elastic body can elastically contact the guide rail through an extended diameter when the wheel periphery 60 is raised off the guide rail.

What is claimed is:

1. A conveyor system driven by a linear motor, which comprises a conveying electric car, four supporting wheels mounted respectively from the front and the back on each side of said car, right and left linear motor bodies mounted on said car and arranged parallel to each other and between the respective front and back supporting wheels of the car, right and left guide rails having a top surface serving as a running rolling surface for said supporting wheels, said guide rails substantially defining the route of the car, each of said linear motor bodies being spaced by a predetermined clearance above a respective one of said guide rails the top surfaces of which also serve as secondary conductors for said linear motors, said linear motor bodies each being provided at their respective front and back ends with a shaft-supported roller, each of said rollers contacts and rolls on the running rolling surface when the clearance between the linear motor body and the running rolling surface opposed to said roller becomes less than said predetermined clearance.

2. The conveyor system of claim 1, wherein said guide rails each comprise a rail body made of steel, and said running rolling surface each comprising a nonmagnetic covering over the steel.

3. The conveyor system of claim 1, wherein said guide rails each comprises a rail body of a nonmagnetic material interpolated with one or more steel plates on a side of the rail facing the running rolling surface thereof.

4. The conveyor system of claim 3, wherein said nonmagnetic material is aluminum.

5. The conveyor system of claim 1, wherein the conveyor system is provided with means for substantially laterally horizontally moving said linear motor bodies along a horizontally curving running route of said conveying electric car.

6. The conveyor system of claim 5, wherein said supporting wheels are steerably arranged in front and in back of said respective linear motor bodies along the sides of said rails, wherein the shafts supporting said rollers are steering shafts, and both the front and the back end of each linear motor body is supported by one of said steering shafts, so that upon a steering movement of said supporting wheel each linear motor body moves towards the outside of any horizontally curving section of said route.

7. The conveyor system of claim 6, wherein said steering shafts are connected with each other for linked steering motion so that only one front and back pair of said supporting wheels rolls on one of the guide rails and is engaged with the guide rail by means of a positioning guiding roller positioned on one side for said steering motion, and the other front and back pair of supporting wheels rolls on the other one of the guide rails, and is steered by a link with the steering motion of said supporting wheels positioned on the other side.

8. The conveyor system of claim 1, further comprising means for linking for steering motion the front supporting wheels on said left and right sides and the rear supporting wheels on the left and right side independently of the front supporting wheels, each of the front and the rear supporting wheels on the same one side being separately coupled to pulse generators each adapted to output a pulse that is proportional to the r.p.m. of the wheel connected thereto, further comprising means for comparing the pulses received from said pulse generator and if one of said wheels is rotating faster than another, then also for transmitting the pulses from the faster rotating wheel to a speed control unit as the present speed of said conveying electric car.

9. The conveyor system of claim 8, further comprising an annular elastic body mounted on the periphery of each of the supporting wheels that are connected to one of said pulse generators, said elastic annular body being adapted to maintain contact by compressive deformation between the periphery of the wheel and the surface of the guide rail, even when the wheel is raised from the guide rail, by elastically enlarging the effective diameter of the periphery of the wheel.

10. A conveyor system driven by a linear motor, which comprises a conveying electric car, right and left linear motor bodies on said car, and a plurality of supporting wheels on said car, a pivotable carrier for each of said wheels, right and left guide rails determining the route of said car, each of said rails having a rolling running surface for said wheels, said surfaces also serving as secondary conductor surfaces for said linear motor bodies, each of said linear motor bodies being disposed adjacent to a respective one of said rolling running surfaces, and having a clearance between each motor body and the adjacent surface, positioning guide rollers for engagement with one of said guide rails, said guide rollers being connected with the pivotable carrier of the supporting wheels on the side of the car of said one of said guide rails, said guide rollers being connected by linkage to the pivotable carrier of the wheels on the other side, whereby the motion of the guide rollers along one guide rail positively steers the wheels on both guide rails.

* * * * *